June 7, 1955     H. L. MUELLER     2,710,207

SEAT POST CLAMP STRUCTURE FOR BICYCLES

Filed Oct. 20, 1951

INVENTOR.
HOMER L. MUELLER
BY
Oberlin + Limbach
ATTORNEYS.

United States Patent Office 2,710,207
Patented June 7, 1955

2,710,207
SEAT POST CLAMP STRUCTURE FOR BICYCLES

Homer L. Mueller, Cleveland, Ohio, assignor to The Cleveland Welding Company, Cleveland, Ohio, a corporation of Ohio Application October 20, 1951, Serial No. 252,265

1 Claim. (Cl. 287—58)

The present invention relates generally as indicated to a seat post clamp structure for bicycles and has for one of its main objects the provision of a clamp structure by means of which a bicycle seat may be securely clamped by its depending post at the desired height and in a predetermined rotary position on the bicycle frame.

Heretofore the most familiar form of bicycle seat post clamp structure has comprised a generally U-shaped clamp member adapted upon drawing together of the legs thereof to press only one pair of semi-annular clamping jaws of the seat post tube of the bicycle frame against opposite sides of the bicycle seat post, this form of clamp structure being open to the objection that there are only two diametrically opposed points of clamping which do not afford a sufficiently tight grip whereby the seat post is apt to slide down into the seat post tube especially under shock loads incident to the use of the bicycle, and furthermore such two-point clamping is often inadequate to hold the seat post against rotation about its longitudinal axis.

Broadly stated, the present invention seeks to overcome the foregoing and other objections to prior constructions by forming three or more axial slots, preferably four, in the upper end portion of the seat post tube so as to provide a corresponding number of arcuate clamping jaws which, through the action of a split clamp member, are deformed radially inward to firmly clamp the seat post therewithin in a desired axial and rotary position regardless of variation in the size and out-of-roundness of the seat post.

Other objects and advantages will become apparent as the following description proceeds.

To the accomplishment of the foregoing and related ends, the invention, then, comprises the features hereinafter fully described and particularly pointed out in the claim, the following description and the annexed drawing setting forth in detail one illustrative embodiment of the invention, this being indicative, however, of but one of the various ways in which the principle of the invention may be employed.

Figure 1:
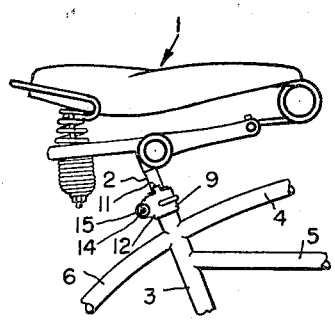
Fig. 1 is a fragmentary elevation view of that portion of a bicycle to which the present invention appertains.

Referring now more particularly to the drawing and first to Fig. 1, the numeral 1 designates a bicycle seat of well-known form having a seat post 2 extending downwardly therefrom into telescoped relation within the upper end portion of the seat post tube 3 of the bicycle frame. The numerals 4, 5, and 6 denote the frame members of the bicycle which are usually welded to said seat post tube 3.

Figure 2:
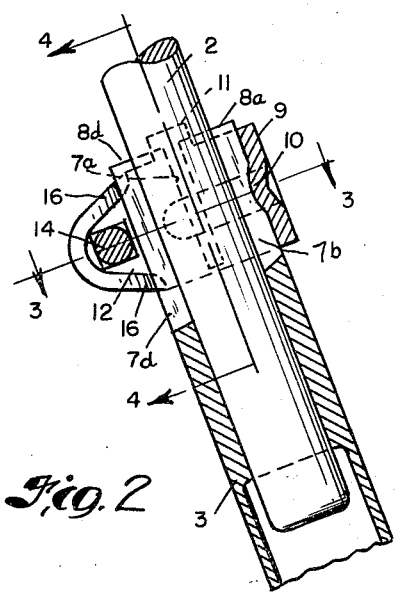
Fig. 2 is a vertical diametrical cross-section view taken substantially along the line 2—2, Fig. 3.
Figure 3:
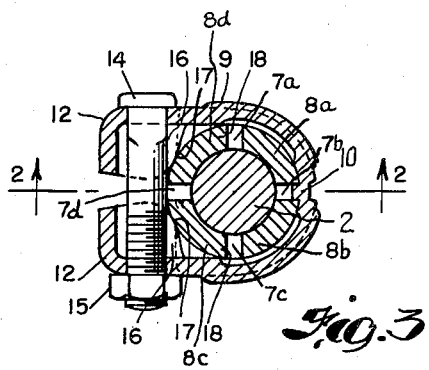
Fig. 3 is a transverse cross-section view taken substantially along the line 3—3, Fig. 2.
Figure 4:
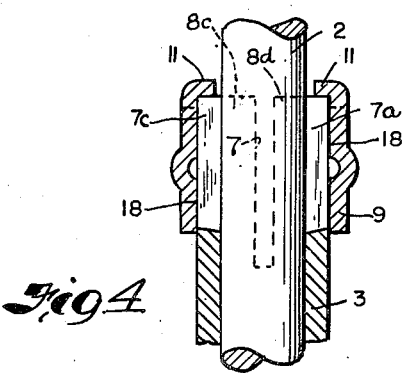
Fig. 4 is a view similar to Fig. 2 except taken along a plane at right angles thereto, viz. the plane indicated by the lines 4—4, Fig. 2.

As best shown in Figs. 2–4, the upper end portion of said tube 3 is formed with four uniformly spaced slots 7a, 7b, 7c, and 7d defining a corresponding number of arcuate clamping jaws or fingers 8a, 8b, 8c, and 8d which are adapted to be deformed radially inwardly into frictional clamping engagement with said seat post 2 telescoped therewithin.

Such radial contraction of the upper end portion of said tube 3 is effected as by means of a U-shaped clamping member 9 which is provided with a boss 10 engaged in slot 7b to non-rotatably position said clamping member on the upper end portion of said tube. Said clamping member 9 is further formed with opposed ears 11 which overlie the upper end of said tube 3 to position member 9 so as to embrace the slotted upper end of said tube. The opposed legs 12, 12 of said clamping member 9 are drawn together for effecting clamping of said jaws 8a, 8b, 8c, and 8d around said seat post 2 as by means of the bolt 14 and nut 15, said bolt 14 having a square shank portion non-rotatably extending through a square hole in one leg 12 of said clamping member and said nut 15 being threaded onto the end of the bolt which extends through a hole in the other leg 12 of said clamping member.

As best shown in Fig. 3, said clamping member 9 extends circumferentially around two adjacent clamping jaws 8a and 8b to embrace the latter so as to preclude twisting or other undesirable deformation thereof. Said clamping member 9 is further formed with two pairs of flanges 16, 16, which, as shown, provide cam surfaces which engage the other two adjacent jaws 8 in a wedge-like manner to afford a force multiplication for enabling high pressure clamping without inducing excessive stresses in the clamping member legs 12, 12 or in the bolt 14 and nut 15.

With seat post 2 inserted into the upper end of tube 3 to the desired extent to regulate the height of seat 1 from the ground or from the bicycle foot pedals (not shown) and rotated to position the longitudinal center line of said seat 1 in the central plane of the bicycle frame, the tightening of nut 15 will draw the legs 12, 12 of clamping member 9 together whereby the wedging action at the points 17 on said other two adjacent jaws 8c and 8d will cause these two jaws to be deformed relative to the adjacent and diametrically opposed jaws 8a and 8b which are embraced and backed up by said clamping member to effect firm clamping by the latter. All of the jaws 8a and 8d are precluded from twisting by reason of the embracing support provided by said clamping member on two jaws 8a and 8b and the support and inward deformation effected on the other two jaws 8c and 8d at the points 18 spaced from the wedging points 17. When said clamping jaws 8a and 8d are deformed as just explained, said seat post 2 will be gripped along four uniformly spaced and relatively wide areas to prevent axial movement and rotary movement thereof with respect to tube 3 even though the seat 1 may be subjected to severe shock loads axially and rotatively.

In the event that the tube 3 is formed with three clamping jaws 8, the clamping member 9 may be arranged to embrace portions of two adjacent jaws with the cams of flanges 16 engaging circumferentially spaced points on the third jaw or said clamping member may be arranged to completely embrace one jaw and portions of the adjacent jaws with the cams respectively engaging such partially embraced jaws. In either case, the tightening of the clamping member will effect uniform deformation of the three jaws to secure the desired firm clamping of the seat post 2. Of course, where more than four jaws are provided on the tube 3, the clamping member 9 will embrace two jaws and portions of the adjacent jaws and the cams of the flanges will preferably engage portions of two adjacent jaws.

Accordingly, the present invention affords an efficient and economical form of clamp structure by means of which the bicycle seat post 2 may be adjustably clamped without danger of rotary or axial slippage from the adjusted clamped position in the seat post tube 3, even though said seat post may vary in diameter or may be out-of-round or otherwise of imperfect cross-section shape.

Other modes of applying the principle of the invention may be employed, change being made as regards the details described, provided the features stated in the following claim, or the equivalent of such, be employed.

I therefore particularly point out and distinctly claim as my invention:

A bicycle seat post clamp structure comprising a circular cross-section tube perpendicularly and diametrically slotted from one end to provide four radially inwardly deformable clamping jaws of substantially the same circumferential extent for frictionally gripping a bicycle seat post therewithin, a U-shaped clamping member having a tube-embracing portion extending approximately half-way around the periphery of the slotted end of said tube from one slot to the diametrically opposite slot to embrace two successive jaws and to contact the adjacent edge portions of the other two jaws and having integral spaced apart parallel legs which are adapted to be drawn together at their free ends to contract said member and thus radially contract the slotted end of said tube at the jaw portions adjacent said one slot and said diametrically opposite slot, and means for so drawing together the free ends of said legs, said legs having lateral portions extending toward each other to provide inwardly facing cam surfaces which are tangent to said tube and disposed to engage said other two jaws only at lines adjacent the slot therebetween whereby such other two jaws at the cam-engaged portions thereof are deformed radially inward to firmly grip a bicycle seat post between the thus radially inwardly deformed clamping jaws.

References Cited in the file of this patent

UNITED STATES PATENTS

| | | |
|---|---|---|
| 2,039,973 | Morgan | May 5, 1936 |

FOREIGN PATENTS

| | | |
|---|---|---|
| 23,546 | Great Britain | Dec. 9, 1895 |